UNITED STATES PATENT OFFICE.

ROBERT E. SCHMIDT AND PAUL TUST, OF ELBERFELD, GERMANY, ASSIGNORS TO THE FARBENFABRIKEN OF ELBERFELD COMPANY, OF NEW YORK.

BLUE ANTHRAQUINONE DYE.

SPECIFICATION forming part of Letters Patent No. 605,921, dated June 21, 1898.

Application filed December 29, 1897. Serial No. 664,426. (No specimens.) Patented in France May 17, 1897, No. 266,999, and in Italy June 30, 1897, XXXIII, 44,832, and LXXXVII, 382.

*To all whom it may concern:*

Be it known that we, ROBERT E. SCHMIDT and PAUL TUST, doctors of philosophy, chemists, of Elberfeld, Germany, (assignors to the FARBENFABRIKEN OF ELBERFELD COMPANY, of New York,) have invented a new and useful Improvement in the Manufacture of Blue Anthraquinone Dye, (for which the Farbenfabriken, vormals Fr. Bayer & Co., has already obtained Letters Patent in France, No. 266,999, dated May 17, 1897, and in Italy, Reg. Gen., Vol. XXXIII, No. 44,832, Reg. Att., Vol. LXXXVII, No. 382, dated June 30, 1897;) and we hereby declare the following to be a clear and exact description of our invention.

Our invention relates to the production of a new dyestuff, being a monosulfo-acid of paradiamidochrysazin having the formula

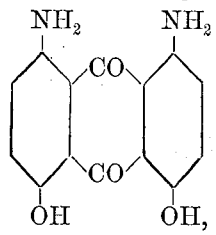

which process consists in treating the paradiamidochrysazin with a suitable sulfonating agent, such as fuming sulfuric acid or the like. In performing this process care must be taken that detrimental bi-reactions are avoided, which can profitably be effected by adding a suitable agent, such as boric acid.

In carrying out our invention practically we can proceed as follows, (the parts being by weight:) Ten parts of paradiamidochrysazin are heated, together with two hundred parts of fuming sulfuric acid (containing about thirty per cent. of $SO_3$) and ten parts of crystalline boric acid, at from 120° to 130° centigrade until the precipitate obtained by pouring a test portion of the mixture into water readily dissolves in a diluted soda-lye with a pure-blue color. The liquid is then allowed to cool, and when cool it is poured into a large quantity of water. The resulting mixture is filtered. The dark-violet residue remaining on the filter, which represents our new dyestuff, is washed by means of water until the filtrate shows a neutral reaction.

If necessary, this dyestuff can be purified by dissolving in a dilute ammonia or sodium-carbonate solution, filtering the solution thus obtained, and finally precipitating the dyestuff with the aid of acids.

The coloring-matter can be used for dyeing purposes either in a pasty state or after previous drying. When dry and pulverized, it represents a blackish powder, which when rubbed assumes a metallic luster. It is dissolved by anilin, pyridin, and dilute alkalies, such as ammonia liquor or a sodium-carbonate or sodium-hydroxid solution, with blue color. In concentrated sulfuric acid it dissolves with a yellow color, which turns into violet-red with a brownish-red fluorescence on the addition of boric acid.

The new coloring-matter dyes unmordanted wool in acid-baths beautiful blue shades, which are distinguished by their fastness against the action of light. On chrome mordanted wool it produces greenish-blue shades, which are very fast to light and milling.

Having now described our invention and in what manner the same is to be performed, what we claim as new, and desire to secure by Letters Patent, is—

1. The production of paradiamidochrysazin-monosulfo-acid by a sulfonation of paradiamidochrysazin.

2. The process for producing a monosulfo-acid of paradiamidochrysazin which process consists in sulfonating the said body by means of fuming sulfuric acid with the addition of boric acid, substantially as hereinbefore described.

3. As a new article of manufacture the new dyestuff, being a monosulfo-acid of paradiamidochrysazin of the formula

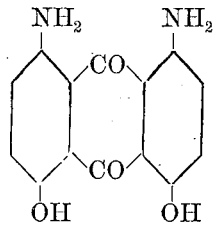

and representing a blackish powder which when rubbed assumes a metallic luster, soluble in anilin, pyridin and in dilute alkalies with blue color, yielding with concentrated sulfuric acid (66° Baumé) a yellow solution which assumes a violet-red color on the addition of boric acid, dyeing unmordanted wool in acid-baths beautiful blue shades very fast to light, yielding on chrome mordanted wool greenish-blue shades very fast to light and milling.

In testimony whereof we have signed our names in the presence of two subscribing witnesses.

ROBERT E. SCHMIDT.
PAUL TUST.

Witnesses:
R. E. JAHN,
OTTO KÖNIG.